United States Patent [19]

Winkelmann

[11] Patent Number: 5,133,325

[45] Date of Patent: Jul. 28, 1992

[54] MECHANICAL DRIVE MECHANISM FOR A SUPERCHARGER OF AN INTERNAL COMBUSTION ENGINE

[75] Inventor: Siegfried Winkelmann, Tettnang, Fed. Rep. of Germany

[73] Assignee: Zahnradfabrik Friedrichshafen, AG., Friedrichshafen, Fed. Rep. of Germany

[21] Appl. No.: 460,919

[22] PCT Filed: Aug. 31, 1988

[86] PCT No.: PCT/EP88/00781

§ 371 Date: Feb. 20, 1990

§ 102(e) Date: Feb. 20, 1990

[87] PCT Pub. No.: WO89/02521

PCT Pub. Date: Mar. 23, 1989

[30] Foreign Application Priority Data

Sep. 5, 1987 [DE] Fed. Rep. of Germany ....... 3729890

[51] Int. Cl.[5] ............................................. F02B 33/00
[52] U.S. Cl. .................................. 123/559.3; 123/561
[58] Field of Search ............................ 123/559.3, 561; 192/3.52; 464/29; 417/319; 418/172, 173

[56] References Cited

U.S. PATENT DOCUMENTS 1,878,210  9/1932  Vincent .
2,552,000  1/1946  DuBois ................................. 123/561
2,588,462  6/1949  Baker .................................. 123/561
3,583,825  6/1971  Sadler et al. ........................ 415/122
4,573,891  3/1986  Sakamaki et al. .................... 418/173

FOREIGN PATENT DOCUMENTS 198312   1/1986   European Pat. Off. .
2324269  1/1975   Fed. Rep. of Germany .
753517   10/1933  France .
2580723  10/1986  France .

Primary Examiner—Richard A. Bertsch
Assistant Examiner—Alfred Basichas
Attorney, Agent, or Firm—Albert M. Zalkind

[57] ABSTRACT

In a mechanical drive mechanism for a supercharger of an internal combusion engine, a rotor fastened to a rotor shaft is driven by the internal combustion engine's crankshaft, an electromagnetically activated separating clutch and a step-up gear. To create favorable structural dimensions of the supercharger drive mechanism in axial and radial extension and a favorable support for an input shaft of the step-up gear, the step-up gear is a planetary gear, with the input shaft supported in an axially projecting collar on the transmission case and the electromagnetically activated separating clutch located on the periphery of that collar. A clutch disk is to be located on one side of this bearing and a ring gear is to be located on the input shaft on the other side.

4 Claims, 1 Drawing Sheet

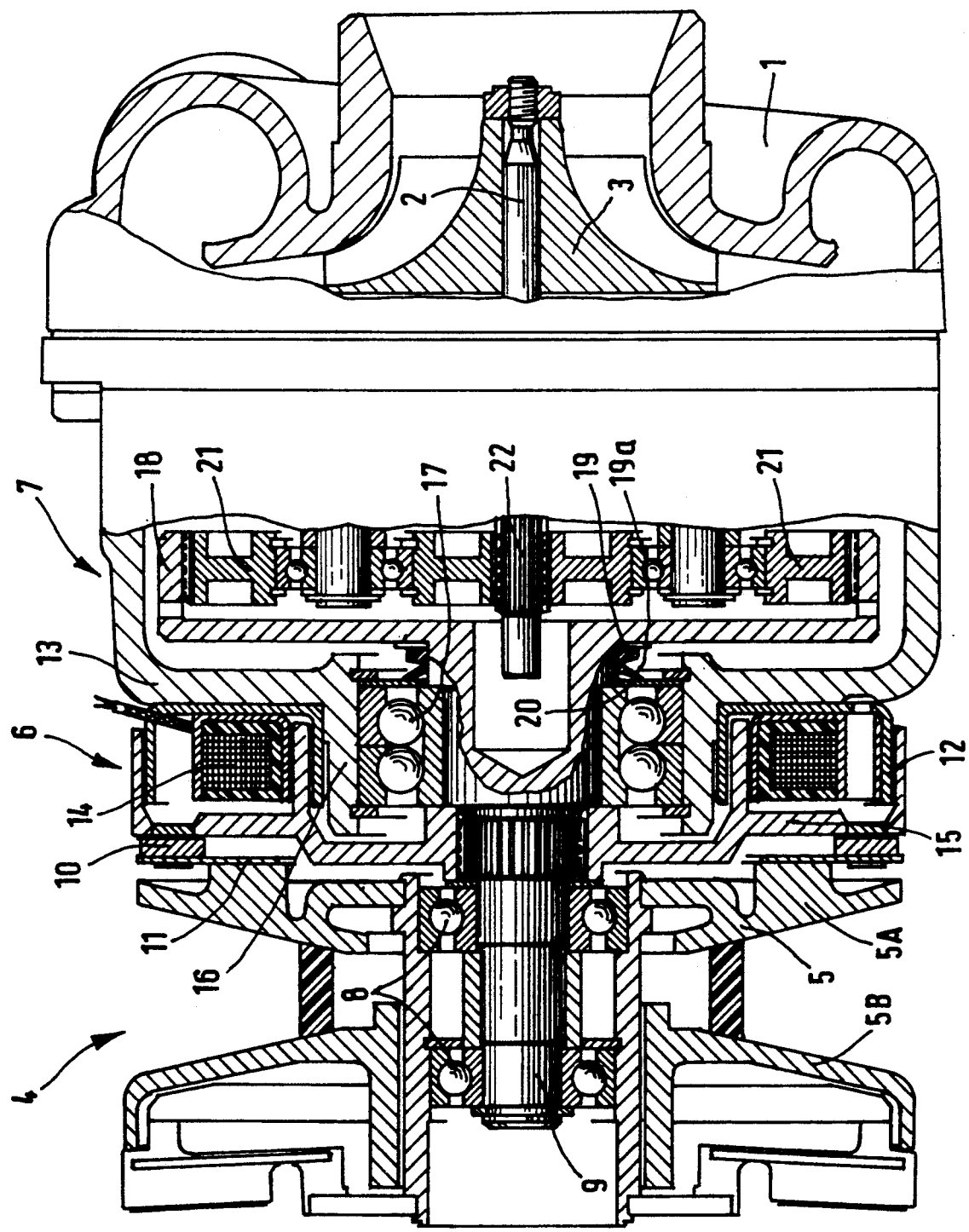

MECHANICAL DRIVE MECHANISM FOR A SUPERCHARGER OF AN INTERNAL COMBUSTION ENGINE

The invention is concerned with a mechanical drive mechanism of a supercharger of an internal combustion engine with a rate of revolutions variator driven by the internal combustion engine's crankshaft from whose secondary disk an input shaft of a step-up gear is capable of being driven by an electromagnetically activated separating clutch, with which step-up gear a rotor shaft with a rotor of the supercharger is connected on the output side.

A mechanical drive mechanism for a supercharger of an internal combustion engine of the above-mentioned type is known from the EP-A 01 98 312 document. According to that document, a supercharger of the gyroscopic type driven by the internal combustion engine's crankshaft is supposed to be connected by means of an electromechanically activated separating clutch when a control member—the gas pedal of the motor vehicle that is driven by the internal combustion engine, for example—is moved out beyond its medium position. A switching of the internal combustion engine from suction operation to charge operation takes place as a result. During charge operation, an induction pressure sufficing for the desired increasing of the torque can be made available at low engine speed by raising the supercharger speed by comparison with the engine speed by means of a rate of revolutions variator.

The object of the invention is to arrive at a compact method of construction for a mechanical drive mechanism for a supercharger of an internal combustion engine of the above-mentioned type by means of which an arrangement of the mechanically driven supercharger in the usually very restricted engine space of a motor vehicle is made possible. In such an arrangement, the input shaft is to be supported in a favorable area in relation to the forces introduced by the drive and output mechanisms.

This object is achieved, for a mechanical drive mechanism for a supercharger of an internal combustion engine of the above-mentioned type, by letting the step-up gear be a planetary gear with an essentially cylindrical outer contour of its transmission case, with the input shaft being supported in an axially projecting collar on the transmission case and the electromagnetic separating clutch being located surrounding the collar radially, by having a clutch disk of the separating clutch fastened near the bearing on the input shaft on the one side and a ring gear of the planetary gear fastened on the other side and by having the radial dimensions of the drive mechanism combined into one unit and the supercharger essentially coincide. By using a planetary gear as a step-up gear, high rate of revolutions gear ratios in coaxial travel of the input and rotor shafts and with small radial external dimensions can be obtained when the drive comes from the input shaft through the ring gear and the secondary drive comes from a sun wheel of the planetary gear. If, as is suggested later on, the input shaft is supported in a radial collar on the transmission case that receives the electromagnetically activated separating clutch on its periphery at the same time, a very short, compact method of constructing the drive mechanism can be achieved, in which a favorable supporting of the input shaft directly between its drive mechanism by means of the separating clutch and its secondary drive mechanism by means of the ring gear can take place simultaneously. Coinciding radial dimensions of the drive mechanism—that is, of the secondary disk and the separating clutch with the supercharger—considerably improve the possibility of installing it in a motor vehicle.

According to a further object of the invention, the supporting of the input shaft can be made very compact and given great radial and axial carrying capacity if a double-line angular ball bearing with a big diameter is used. Because of its big diameter, the double-line angular ball bearing has a supporting space on the input shaft extending into the area where the ring gear and the clutch disk are located.

The use of a V-shaped gasket that is pressed onto the input shaft and whose side lies next to a disk that is fixed in the transmission case by means of a sealing lip makes an advantageous sealing off of the double-line angular ball bearing against the interior of the transmission case possible. Under increasing centrifugal force, the pressing of the sealing lip onto the disk is reduced, so that friction and the consequent loss of effectiveness, wear and heating while the supercharger is operating can be decreased. An especially favorable arrangement of the electromagnetically activated separating clutch is obtained by having the magnetic element with coil serving the purpose of activating it fastened to the transmission case and an anchor disk fastened to the secondary disk of the rate of revolutions variator. An operating current installation or a permanent magnet installation can be provided, alternatively, as a separating clutch. With the operating current installation, a magnetic field builds up when the current flows through the coil, and as a result a pull on the anchor disk becomes operative. With the permanent magnet installation, a stable permanent magnet causes the pull on the anchor disk with its magnetic field—that is, the clutch is operated or the brakes are applied in currentless condition. In another embodiment of the invention, single-leaf springs for returning the anchor disk are located between it and the secondary disk.

The invention is not limited to the combination of features in the claims. For an expert, additional, logical possible combinations of claims and individual features mentioned in claims follow from the statement of the object.

For further explanation of the invention, the reader is referred to the drawing, in which an embodiment is represented partially in longitudinal section.

In the one drawing, a supercharger designated 1 has a rotor 3 that is driven by a rotor shaft 2. The propulsion of the rotor is accomplished by an internal combustion engine (not shown), and preferably its on-the-face secondary drive of the crankshaft on a primary disk (also not shown) of a rate of revolutions variator 4. The rate of revolutions variator 4 is a looping gear, with a secondary disk 5 being driven by the primary disk. For purposes of propulsion, the secondary disk is capable of being connected with the rotor shaft 2 by an electromagnetically activated separating clutch 6 and a planetary gear 7 serving as a step-up gear. In addition, the secondary disk 5 has two cone pulleys 5A and 5B, of which cone pulley 5B, by comparison with cone pulley 5A, is displaceable in such a way that the contact area for a driving belt, and consequently the diameter that is effective for the multiplication, is changed. When the cone pulleys 5A and 5B are apart from each other, the secondary disk 5 has a small secondary-drive diameter, and when the cone pulleys 5A and 5B are pushed into each other as far as possible, it has a big secondary-drive diameter. The secondary disk 5 is supported, capable of rotating freely over roller bearings 8, on an input shaft 9 of the planetary gear 7. In addition, the secondary disk 5 is capable of being coupled to the input shaft 9 by the electromagnetically activatable separating clutch 6.

The electromagnetically activatable separating clutch 6 has an anchor disk 10 that is fastened to the cone pulley 5A by single-leaf springs 11. A clutch housing 12 is located, stationary, at a transmission case 13 of the planetary gear 7 and receives a magnetic element with coil 14. A clutch disk 15 lying between the anchor disk 10 and the magnetic element with coil 14 is again connected, resistant to rotation, with the input shaft. Thus a propulsion takes place of the input shaft 9 from the secondary disk 5 to the input shaft 9 through the coupled-in separating clutch 6 when the clutch disk 15 is coupled to the anchor disk 10.

Furthermore, the transmission case 13 of the planetary gear 7 has an axially projecting collar 16 that serves the purpose of supporting the input shaft 9 by means of a double-line angular ball bearing 17. The space surrounding the collar 16 radially up to the cylindrical outer contour of the transmission case 13 serves the purpose of receiving the separating clutch 6. A ring gear 18 of the planetary gear 7 is fastened to the input shaft 9 right next to the double-line angular ball bearing 17 in the transmission case. The interior of the transmission case 13 is sealed off against the angular ball bearing 17 by a V-shaped gasket 19 that works together with a disk 20 that is fastened in the transmission case 13. For that purpose, the gasket 19 has an axially-projecting sealing lip 19A that is located next to the disk 20. As the input shaft's rate of revolutions increases, the pressing force of the sealing lip 19A on the disk 20 declines under the influence of centrifugal force.

It can be seen from the drawing that the unit consisting of the secondary disk 5, the separating clutch 6, the planetary gear 7 and the supercharger 1 has very favorable dimensions both radially and axially. The axial dimensions are reduced by having the collar 16 receive the double-line angular ball bearing 17 of the input shaft 9 inside it and the separating clutch 6 outside of it. Furthermore, the angular ball bearing 17 is favorably located with respect to the drive of the input shaft 9 by the clutch disk 15 and with respect to the secondary drive by the ring gear 18.

The ring gear 18 drives a sun wheel 22 built as one piece with the rotor shaft 2 by planetary wheels 21 as a permanent gear.

I claim:

1. A mechanical drive mechanism for the supercharger (1) of an internal combustion engine, comprising
   (a) a variable RPM drive assembly (4) driven by a crankshaft of the engine and having a secondary plate (5);
   (b) a planetary step-up gear (7) connected with a sun wheel (22) of the supercharger and including
      (1) an input shaft (1);
      (2) a transmission case (13) having a first cylindrical outer contour portion and a second cylindrical collar portion (16) projecting from said first portion, said collar portion having an outer diameter less than that of said first portion; and
      (3) a ring gear (18) mounted on the input shaft radially surrounding and connected with the supercharger sun wheel;
   (c) An electromagnetic clutch (6) radially surrounding said planetary gear collar portion and including a clutch plate (15) operable to connect said input shaft with said secondary pate in order to drive said input shaft from the engine; and
   (d) dual row angular contact bearing means (17) for mounting said planetary gear collar portion coaxially about the input shaft, said clutch plate being secured to the input shaft adjacent to said bearing means on an input side thereof and said ring gear being mounted on the input shaft adjacent said bearing means on the opposite side thereof from said clutch place, whereby the drive mechanism has a compact axial and radial configuration and further whereby the input shaft is accurately supported.

2. A drive mechanism as defined in claim 1, and further comprising
   (a) a sealing plate (20) connected with said case adjacent said bearing assembly for sealing the interior of said case from said bearing assembly; and
   (b) a V-shaped gasket (19) connected with the input shaft, said gasket having a lip (19A) contiguous with said sealing plate.

3. A drive mechanism as defined in claim 1, wherein said electromagnetic clutch includes a magnetic element and coil assembly (14) connected with said case and an anchor plate (10) connected with a secondary plate (5) or an RPM variable drive (4) connected with the internal combustion engine.

4. A mechanical drive mechanism for the supercharger of an internal combustion engine, the supercharger having a step-up gear including an input shaft (9) having a longitudinal axis and being driven off of the internal combustion engine upon actuation of an electromagnetic clutch (6), the drive mechanism comprising
   (a) a planetary gear (7) defining the step-up gear and including a transmission case (13) having a first cylindrical outer contour portion and a second cylindrical collar portion (16) projecting from said first portion, said collar portion having an outer diameter less than that of said first portion, the clutch radially surrounding said planetary gear collar portion;
   (b) dual row angular contact bearing means (17) for mounting said planetary gear collar portion (16) coaxially about the input shaft;
   (c) a clutch plate (15) of the electromagnetic clutch secured to the input shaft adjacent said bearing means on an input side thereof, said electromagnetic clutch further including a magnetic element and coil assembly (14) connected with said case and an anchor plate (15) connected with a secondary plate of an RPM variable drive (4) connected with the internal combustion engine;
   (d) single-leaf springs (11) for connecting said anchor plate with said secondary plate; and
   (e) a ring gear (18) mounted on the input shaft adjacent said bearing means on the opposite side thereof from said clutch plate, whereby the drive mechanism has a compact axial and radial configuration and further whereby the input shaft is accurately supported.

* * * * *